United States Patent
Dickelman et al.

(10) Patent No.: US 7,669,239 B2
(45) Date of Patent: Feb. 23, 2010

(54) SECURE NETWORK SYSTEM AND ASSOCIATED METHOD OF USE

(75) Inventors: Mark J. Dickelman, Inverness, IL (US); Prakash Ramsamooj, Bradenton, FL (US)

(73) Assignees: JPMorgan Chase Bank, N.A., New York, NY (US); U.S. Bancorp Licensing, Inc., Minneapolis, MN (US)

( * ) Notice: Subject to any disclaimer, the term of this patent is extended or adjusted under 35 U.S.C. 154(b) by 1362 days.

(21) Appl. No.: 10/708,004

(22) Filed: Feb. 2, 2004

(65) Prior Publication Data

US 2005/0060579 A1    Mar. 17, 2005

Related U.S. Application Data

(60) Provisional application No. 60/481,380, filed on Sep. 15, 2003.

(51) Int. Cl.
*G06F 12/14* (2006.01)
*G06F 11/00* (2006.01)
*H04L 29/06* (2006.01)

(52) U.S. Cl. .................. 726/22; 726/23; 726/24; 726/25; 726/26; 713/166

(58) Field of Classification Search ............... 713/166; 726/22–26
See application file for complete search history.

(56) References Cited

U.S. PATENT DOCUMENTS

| | | | | |
|---|---|---|---|---|
| 4,984,272 A | * | 1/1991 | McIlroy et al. | 726/17 |
| 5,692,124 A | * | 11/1997 | Holden et al. | 726/2 |
| 5,841,869 A | * | 11/1998 | Merkling et al. | 713/164 |
| 6,321,337 B1 | * | 11/2001 | Reshef et al. | 726/14 |
| 7,073,059 B2 | * | 7/2006 | Worely et al. | 713/168 |
| 7,152,242 B2 | * | 12/2006 | Douglas | 726/23 |
| 7,418,591 B2 | * | 8/2008 | Tachikawa | 713/155 |
| 2002/0078382 A1 | * | 6/2002 | Sheikh et al. | 713/21 |
| 2004/0117658 A1 | * | 6/2004 | Klaes | 713/201 |

OTHER PUBLICATIONS

Trusted Solaris 8 Operating Environment, A Technical Overview, 2000, www.sun.com/solaris, Sun MicroSystems, Inc, Palo Alto, California, U.S.*
The Austin, et al., Myth of Secure Computing, Harvard Business Review, Jun. 1, 2003, The President and Fellows of Harvard College, Dow Jones Reuters Business Interactive L.L.C., U.S.
Trusted Solaris™ 8 Operating Environment, A Technical Overview, 2000, www.sun.com/solaris, Sun MicroSystems, Inc, Palo Alto, California, U.S.

* cited by examiner

*Primary Examiner*—Christopher A Revak
*Assistant Examiner*—Trang Doan
(74) *Attorney, Agent, or Firm*—Goodwin Procter LLP

(57) ABSTRACT

A network computer system for providing security that includes a monitoring function for the network computer system utilizing compartments that can be logical or separate physical hardware, at least one outside server for an untrusted computer network, e.g., global computer system, at least one proxy server, at least one inside server, wherein the at least one outside server is able to read and write software code to the at least one proxy server and the at least one proxy server is able to read and write software code to the at least one inside server, wherein the monitoring function can read and execute software code from the at least one outside server, the at least one proxy server and the at least one inside server. There is a top/down security function to prevent access to higher compartments.

42 Claims, 1 Drawing Sheet

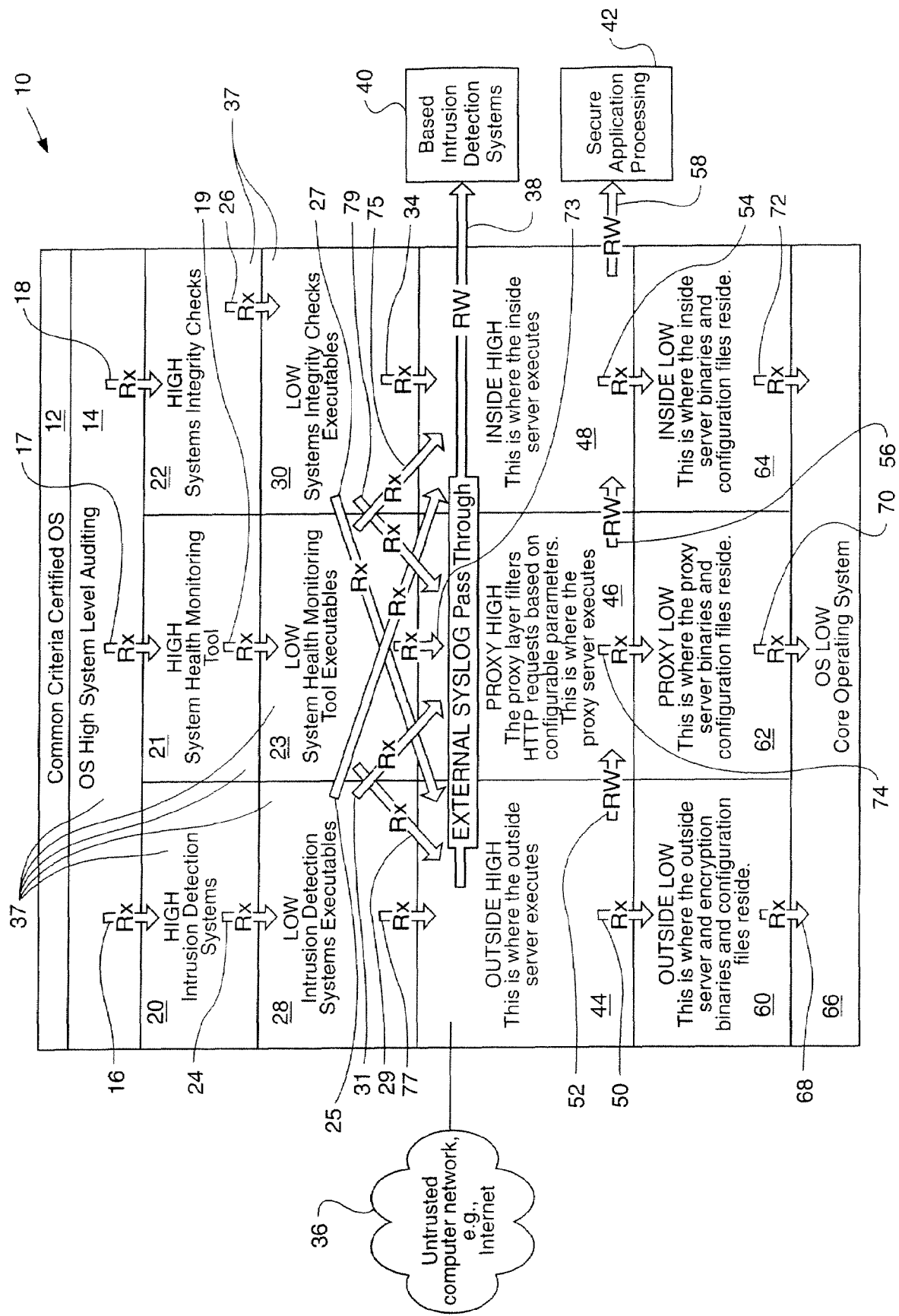

SECURE NETWORK SYSTEM AND ASSOCIATED METHOD OF USE

CROSS REFERENCE TO RELATED APPLICATIONS

This patent application claims priority to U.S. Provisional Patent Application Ser. No. 60/481,380 filed Sep. 15, 2003.

BACKGROUND OF INVENTION

The need for providing security to computing systems has never been so critical as it is today. It is believed that traditional system security methods are no longer sufficient since access and duplication methods may still be available. Also, secure gateways for sending sensitive information between organizations may not be present. Security issues that need to be addressed include: limit access to system resources and data; provide controls regarding interactions with software programs, software file access, and utilities on a user-by-user basis; eliminate "super user" access by dividing super user functions into multiple roles to decrease security risks; provide an independent evaluation and auditing authority to the operating system to validate the security functions; prevent "eavesdropping" in the operating environment and provide a trusted path; prevent spoofing programs; and protect local devices against unauthorized users or use.

Therefore, Common Criteria Certification, a globally accepted standard for security certification for computer networks, was developed. This certification is upheld by an independent third party organization that performs security evaluations. However, in order to maximize security when utilizing an untrusted computer network, e.g., global computer system such as, but not limited to, the Internet, to achieve Common Criteria Certification, requires a significant duplication of hardware, software, server compartments, vendors and software languages. This security need involves protection of content available from the untrusted computer network as well as provide a safe passage of the data from this untrusted system access to an organization's secure computing environment. This need is for any organization that transmits and receives personal, confidential, proprietary and/or financial data. This applies to virtually every industry with particular applicability to organizations that conduct financial transactions over an untrusted computer network such as the financial services industry. A financial transaction of special interest includes a credit card transaction. Other industries that could benefit from this type of security include the government, e.g., military organizations, healthcare and the airline industry. Control of inventory data is crucial to having a secure system. Moreover, there is a strong need to prevent the hacking and associated defacing of websites that are accessible to the public.

The present invention is directed to overcoming one or more of the problems set forth above.

SUMMARY OF INVENTION

In one aspect of this invention, a network computer system for providing security is disclosed. This network computer system includes a monitoring function for the network computer system, at least one outside server for an untrusted network, e.g., a global computer system, wherein the monitoring function can read and execute data from the at least one outside server for the untrusted computer network, at least one proxy server, wherein the at least one outside server for the untrusted computer network is able to read and write data to the at least one proxy server, wherein the monitoring function can read and execute data from the at least one proxy server, at least one inside server, wherein the at least one proxy server is able to read and write data to the at least one inside server, wherein the monitoring function can read and execute data from the at least one inside server, and a core operating system, wherein the at least one outside server, the at least one proxy server and the at least one inside server can read and execute data from the core operating system.

In another aspect of this invention, a method for providing security to a network computer system is disclosed. The process includes reading and executing data from at least one outside server for an untrusted computer network, e.g., global computer system, with a monitoring function, reading and executing data from at least one proxy server for the untrusted computer network with the monitoring function, reading and writing data from the at least one outside server to the at least one proxy server, reading and executing data from at least one inside server for the untrusted computer network with the monitoring function, reading and writing data from the at least one proxy server to the at least one inside server, and reading and executing data from a core operating system, which is a portion of an operating system, with the at least one outside server, the at least one proxy server and the at least one inside server.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawing where FIG. 1 is a schematic of a secure network services integrated design in accordance with the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures and compartments have not been described in detail so as to obscure the present invention. A server referred to in this Application can be a single processor or a whole series of processors. An illustrative, but nonlimiting, example of just one type of server that may suffice is the Sun Fire 4800™ Server, sold by Sun Microsystems, Inc. having a place of business at 4150 Network Circle, Santa Clara, Calif. 95054.

The method of communication for this Invention is through any untrusted computer network and preferably a global computer system, e.g., the Internet. However, there are numerous mechanisms for electronic communication that might suffice for this present invention.

The purpose of the present invention is to provide a continuous and safe operation of a website located on an untrusted computer network. This is to provide maximum protection of the website while providing a safe passage of data into an organization's secure computing environment. The preferred design, illustrated by the schematic of FIG. 1, includes a series of compartments and is generally indicated by numeral 10. The compartments are preferably logical compartments for separate software functions but separate compartments of physical hardware can also be utilized to form the compartments. Moreover, compartments within this patent application do not specifically need to be a traditional logical compartment but can be a sensitivity label or a combination of logical compartments and sensitivity labels. Moreover, it can include any mechanism for identifying separate software functions. The preferred logical compartments can be collapsed and optimally housed within a unitary piece of hardware for an entire information technology enterprise. The preferred operating system is one that is Common Criteria Certified and is generally indicated by numeral 12. Illustrative, but nonlimiting, examples include TRUSTED SOLARIS™, licensed by Sun Microsystems, Inc. having a place of business at 4150 Network Circle, Santa Clara, Calif. 95054. Another illustrative, but nonlimiting example includes WINDOWS® 2000™ licensed by Microsoft, Inc. having a place of business at One Microsoft Way, Redmond, Wash. 98052-6399. TRUSTED SOLARIS™ is currently preferred over WINDOWS®2000™ since TRUSTED SOLARIS™ has received EAL4 LSPP Common Criteria Security Certification for an enterprise software application versus a stand-alone software application.

The design of the secure network system of the present invention is based on a compartmental approach using the labeling features of a trusted operating system. The design is a top-down approach, with the least privileges allowed to the more vulnerable areas of the operating system. With a top-down approach, communication is limited, as described herein, and communication is only from upper compartments to immediately adjacent lower compartments. This downward communication is limited to the reading and execution of data, without writing. The only reading and writing of data is between immediately adjacent servers, as will be discussed in greater detail below.

Referring now to FIG. 1, the first compartment provides system level auditing 14 and is labeled "high." Examples of system level auditing include syslog "system log protocol" events produced by the operating system. Syslog events include a transport mechanism for sending event messages across an IP, i.e., Internet Protocol, network that specifies the format of packets (also called datagrams) and the addressing scheme. The receiving server is known as an "event message collector." System events may be sent at the start or end of a process or to transmit the current status of some condition or process in the operating system or a software application. These log messages are well protected and are not available to other compartments in the system. Although there are a number of separate software programs that can perform this function, an illustrative, but nonlimiting, example of this type of system level auditing software includes TRUSTED SOLARIS™, licensed by Sun Microsystems, Inc. having a place of business at 4150 Network Circle, Santa Clara, Calif. 95054. TRUSTED SOLARIS™ is considered a military-grade version of the UNIX® operating system, which is an operating system registered by The Open Group, having a place of business at 44 Montgomery Street, Suite 960, San Francisco, Calif. 94104-4704. Access to the TRUSTED SOLARIS™ system through the log-in function and passwords by authorized users from within the enterprise and described in technical literature that is available from Sun Microsystems, Inc.

There is an intrusion detection system that includes a second logical compartment and a third logical compartment indicated by numerals 20 and 28, respectively. A host-based intrusion detection system (HIDS software) uses misuse detection that analyzes the information it gathers and compares it to large databases of attack signatures. The HIDS software looks for a specific attack that has already been documented. The HIDS software is only as good as the database of attack signatures that the HIDS software uses to make comparisons of packets. The HIDS software can also include anomaly detection, wherein the system administrator defines a baseline or normal state of the network's traffic load, breakdown, protocol, and typical packet size. The anomaly detector monitors network segments to compare their state to the normal baseline and look for anomalies. The HIDS software can either be a passive system or a reactive system. In a passive system, the HIDS software detects a potential security breach, then logs the information and signals an alert. In a reactive system, the HIDS software responds to the suspicious activity by logging off a user or by blocking network traffic from the suspected malicious source.

The second compartment 20 is where the HIDS software will actually operate. This HIDS software will monitor events real time as they occur on the operating system and is labeled "high." The first compartment 14, which is the system level auditing function, can read and execute data from the second compartment 20 having the HIDS software as indicated by the arrow identified by numeral 16.

The third compartment 28 is where the source code for the HIDS software resides and is labeled "low." The second compartment 20, the HIDS software labeled "high," allows the reading and execution of the source code software programs from the third compartment 28, the HIDS software labeled "low," but will not allow the modification or configuration of the software source code as indicated by the arrow identified by numeral 24.

An illustrative, but nonlimiting, example of this type of the HIDS software for both the second compartment 20 and the third compartment 28 includes Intruder Alert™, licensed by Symantec Corporation and having a place of business at 20330 Stevens Creek Blvd, Cupertino, Calif. 95014. This illustrative, but nonlimiting, example software program is a host-based, real-time intrusion monitoring system that detects unauthorized activity and security breaches and responds automatically. If a threat is detected, it sounds an alarm or takes other counter-measures according to pre-established security policies in order to prevent information loss or theft. The administrator(s) can create, update, and deploy policies and securely collect and archive audit logs for incident analysis, all while maintaining the availability and integrity of the secure network system 10. This example software enables the development of precautionary security policies that prevent hackers or authorized users with malicious intent from misusing the system 10, software applications 42 and associated data.

There is a system health monitoring tool that includes a fourth compartment and a fifth compartment indicated by numerals 21 and 23, respectively. A system health monitoring tool involves centralized or distributed monitoring of server health and response time. The system health monitoring tool also provides automated root cause analysis that can pinpoint the source of server problems, correct formatted page response time problems by understanding which elements are under-performing, validate the content delivery of dynamically formatted pages, and understand system usage with access log monitoring.

The fourth compartment 21 is where the system health monitoring tool will actually operate and is labeled "high." The first compartment 14, which is the system level auditing function, can read and execute data from the fourth compartment 21 having the system health monitoring tool software as indicated by the arrow identified by numeral 17.

The fifth compartment 23 is where the source code software programs for system health monitoring tool resides and is labeled "low." The fourth compartment 21, system health monitoring tool labeled "high," allows the reading and execution of these source programs from the fifth compartment 23, which is the system health monitoring tool labeled "low" but will not allow the modification or configuration of the source code software programs as indicated by the arrow identified by numeral 19.

An illustrative, but nonlimiting, example of this type of system health monitoring tool software for both the fourth compartment 21 and the fifth compartment 23 includes: HP Open View™, licensed by Hewlett-Packard Company and having a place of business at 3000 Hanover Street, Palo Alto, Calif. 94304-1185; TIVOLI®, licensed by IBM® North America having a place of business at 1133 Westchester Avenue, White Plains, N.Y. 10604; and BMC PATROL®, licensed by BMC Software, Inc., having a place of business at 2101 City West Blvd., Houston, Tex. 77042-2827.

Some of the features from the above illustrative, but nonlimiting, example software programs include the automation of support functions such as providing parameters for monitoring the environment for the secure network system 10 and providing automatic recovery actions where appropriate, to handle unattended actions. Administrative functions performed by this software can include canceling, deleting or resubmitting jobs, reporting status of individual job completions, triggering a watchdog cycle, enabling or disabling service-level tracing for diagnostics, purging old status objects and viewing the details of all events for the secure network system 10.

There is an integrity check system that includes a sixth compartment and a seventh compartment indicated by numerals 22 and 30, respectively. System integrity checking involves the quality of correctness, completeness, wholeness, soundness and compliance with the intention of the people who created the data. This is achieved by determining that there was no accidental or deliberate, but unauthorized, insertion, modification or destruction of data in the system 10. Data integrity is one of the six fundamental compartments of information security, which include: confidentiality; possession; integrity; authenticity; availability; and utility. The integrity check system 22 and 30 will monitor changes to a baseline configuration of the operating system and other third party software. If a change is detected to a baseline configuration parameter, an alert can be generated to acknowledge the change.

The sixth compartment 22 is where the integrity check system will actually operate and is labeled "high." The first compartment 14, which is the system level auditing function, can read and execute data from the sixth compartment 22 having the integrity check software as indicated by the arrow identified by numeral 18.

The seventh compartment 30 is where the source code software programs for the integrity check system resides and is labeled "low." The sixth compartment 22, integrity check system labeled "high," allows the reading and execution of these source programs from the seventh compartment 30, which is the integrity check system labeled "low" but will not allow the modification or configuration of the source programs as indicated by the arrow identified by numeral 26.

An illustrative, but nonlimiting, example of this type of the integrity check system software for both the sixth compartment 22 and the seventh compartment 30 includes Enterprise Security Manager™, licensed by Symantec Corporation and having a place of business at 20330 Stevens Creek Blvd, Cupertino, Calif. 95014. This illustrative, but nonlimiting, example software program provides a comprehensive security policy compliance management of software applications and operating systems across an enterprise. This example software program from a single location can manage the discovery of policy deviations and vulnerabilities and can quickly and cost-effectively create baselines and measure performance against those baselines to identify systems that are not in compliance and correct faulty settings to bring the secure network system 10 back into compliance. Moreover, this example software program performs over 1,500 checks, automatically assessing policy compliance and security on servers, workstations, routers, hubs, applications, and databases and is scalable.

Collectively, the previously described system level auditing 14, intrusion detection system 20, 28, system health monitoring tool 21, 23 and the integrity check system 22, 30 are referred to as "monitoring function" and are indicated by numeral 37. However, each one of these features alone or in combination can provide a "monitoring function" as well as a number of other similar software features that monitor performance of the system or provide analysis to recognize potential or real security threats. Not all of these features are required.

The compartmentalized secure network system of the present invention 10 obtains access to an untrusted computer network 36, which can include, but is not limited to, a global computer system or Internet, through an outside server indicated by an eighth compartment 44 and a ninth compartment 60. These servers are preferably, but not necessarily, "web servers." A web server is a program using the client/server model and the preferably, but not necessarily, Hypertext Transfer Protocol (HTTP), to provide files that form formatted pages for users that make requests. Although the term "web" is utilized, the present invention is not restricted to the Internet 36 or the Worldwide Web. The client/server model describes the relationship between two computer programs in which one program, the client, makes a service request from another program, the server, which fulfills the request. The client/server model provides a convenient way to interconnect programs that are distributed efficiently across different locations within a network.

The eighth compartment 44 is established to host the external untrusted computer network, e.g., global computer system 36. This is the portion of the compartmental design that faces the public from an untrusted source. From this region, all requests are received, processed, and then passed to other regions of the compartmentalized secure network system 10 for further processing. This eighth compartment 44 is where the outside server executes and is labeled "high." Preferably, but not necessarily, this server is a web server, which is a computer that delivers or serves up formatted, e.g., web pages. Every web server has an IP (Internet Protocol) address and possibly a domain name. When a Uniform Resource Locator (URL) is entered in a web browser, this sends a request to the outside server 44 with a matching domain name. The outside server 44 then fetches the page named "index.html" and sends it to the web browser.

The third compartment for the intrusion detection system 28 can read and execute data from the eighth compartment 44 where the outside server executes and is labeled "high" as indicated by the arrow identified by numeral 77. The fifth compartment for the system health monitoring tool 23 can read and execute data from the eighth compartment 44 where the outside server executes and is labeled "high," as indicated by the arrow identified by numeral 29. The seventh compartment for the integrity check system 30 can read and execute data from the eighth compartment 44 where the outside server executes and is labeled "high" as indicated by the arrow identified by numeral 27.

This limited access to the compartment 44 where the outside server executes and is labeled "high," as well as other compartments of the compartmentalized secure network system 10, prevents the graphics from the untrusted computer network, e.g., web pages, from being defaced due to the blocking of data from upper levels of compartments. No configuration changes are allowed in this eighth compartment 44. Configuration is the way a computer system is set-up, or the assortment of compartments that make-up the system. Configuration can refer to either hardware or software, or the combination of both.

This eighth compartment 44, outside server labeled "high," can read and execute from the ninth compartment 60, as indicated by the arrow identified as numeral 50, where the outside server is labeled "low." This ninth compartment 60 is where the encryption binaries and configurations source code files for the outside server reside. This is where configuration changes can be made to the outside server.

A nonlimiting example of an outside server for both the eighth compartment 44 and the ninth compartment 60 includes the Sun ONE™ web server, sold by Sun Microsystems, Inc. having a place of business at 4150 Network Circle, Santa Clara, Calif. 95054.

Adjacent to the eighth compartment 44 and ninth compartment 60 is a proxy server indicated by a tenth compartment 46 and an eleventh compartment 62. In typical applications, a proxy server is a server that sits between an outside server and system software applications. A proxy server intercepts all requests from the outside server 44 and 60 to see if it can fulfill the requests itself. If not, it forwards the request to an inside server 48 and 64, described hereinafter below. There are two main purposes for a proxy server. The first is to drastically improve performance for groups of users by saving the results of all requests for a certain amount of time. The proxy server can provide the same requested formatted, e.g., web, page itself rather than procure the web page from the outside server, which can save considerable time. The second primary function of the proxy server is to filter requests. This can include preventing access to objectionable websites. This can include detecting binary string size against a predetermined threshold, perform buffer checks, and determine if there are file extension requests, among other potential checks, to evaluate the request.

The tenth compartment 46 is where a proxy server resides to filter requests received from the outside server 44 that is labeled "high." At this tenth compartment 46, additional screening is performed on the incoming request such as a hypertext protocol request buffer checks, and file extension requests, which are validated for legitimacy, prior to allowing any further processing of the request. This tenth compartment 46 can read and execute from the eleventh compartment 62 for the proxy server that is labeled "low."

An illustrative, but nonlimiting, example of a proxy server that can function for both the tenth compartment 46 and the eleventh compartment 62 includes the Sun ONE™ proxy server sold by Sun Microsystems, Inc. having a place of business at 4150 Network Circle, Santa Clara, Calif. 95054.

The third compartment for the intrusion detection system 28 can read and execute data from the tenth compartment 46 where the outside server executes and is labeled "high" as indicated by the arrow identified by numeral 31. The fifth compartment for the system health monitoring tool 23 can read and execute data from the tenth compartment 46 where the outside server executes and is labeled "high" as indicated by the arrow identified by numeral 73. The seventh compartment for the integrity check system 30 can read and execute data from the tenth compartment 46 where the outside server executes and is labeled "high" as indicated by the arrow identified by numeral 79.

The eighth compartment 44 for the outside server labeled "high" can read and write to the tenth compartment 46 where the proxy server resides that is labeled "high" as indicated by the arrow identified by numeral 52. This eleventh compartment 62 is where the source programs for the proxy server resides as well as the location where configuration changes can be made to the proxy server. This tenth compartment 46, proxy server labeled "high" can read and execute from the eleventh compartment 62, as indicated by the arrow identified as numeral 74, where the proxy server is labeled "low," which is where the binaries and configurations source code files for the proxy server reside. This is also where configuration changes can be made to the proxy server. Configuration is the way a computer system is set-up, or the assortment of compartments that make up the system. Configuration can refer to either hardware or software, or the combination of both.

Adjacent to the tenth compartment 46 and the eleventh compartment 62 is an inside server indicated by a twelfth compartment 48 and a thirteenth compartment 64. An inside server is the secure portion of the compartmental design of the secure network system 10. From this region, all requests received from the untrusted source or computer system, e.g., public facing Internet 36, through the outside server 44 and 66, have been screened and deemed valid for enterprise processing within the secure network system 10. The read/write function from the proxy server 46 that is labeled "high" to the inside server that is labeled "high" is indicated by the arrow identified by numeral 56. No configuration changes are allowed within this twelfth compartment 48 for the inside server.

A nonlimiting example of an inside server for both the twelfth compartment 48 and the thirteenth compartment 64 includes the Sun ONE™ web server, sold by Sun Microsystems, Inc. having a place of business at 4150 Network Circle, Santa Clara, Calif. 95054.

The connectivity to the enterprise application logic for the secure application processing 42 resides within this twelfth compartment 48 through the read/write function that is indicated by the arrow having the numeral 58. This provides connection to at least one secure software application for the enterprise.

For the inside server, the twelfth compartment 48 reads data and executes from the thirteenth compartment 64, wherein the thirteenth compartment 64 is the place where the binaries and configuration files reside. No configuration changes are allowed within the thirteenth compartment 64. The capability for the twelfth compartment 48 to read data from the thirteenth compartment 64 is indicated by the arrow identified by numeral 54. The thirteenth compartment 64 is where the source programs for the inside server resides as well as the location where configuration changes can be made to the inside server.

The third compartment for the intrusion detection system 28 can read and execute data from the twelfth compartment 48 where the outside server executes and is labeled "high" as indicated by the arrow identified by numeral 25. The fifth compartment for the system health monitoring tool 23 can read and execute data from the twelfth compartment 48 where the outside server executes and is labeled "high" as indicated by the arrow identified by numeral 75. The seventh compartment for the integrity check system 30 can read and execute data from the twelfth compartment 48 where the outside server executes and is labeled "high" as indicated by the arrow identified by numeral 34.

The fourteenth compartment 66 is the core operating system. The core operating system is a master control program that runs the secure network system 10. The operating system sets the standards for all application programs that run in the computer. All of the software applications in the system communicate with an operating system for all user interface and file management operations. Moreover, the operating system oversees the following functions: user interface; job management; task management; data management; device management for peripherals; security to keep unauthorized users out of the system; and backup and recovery functions. The core operating system in the fourteenth compartment 66 allows the ninth compartment 60, which is the outside server labeled "low" that has the encryption binaries and configuration files for the outside server read and execute source programs from this fourteenth compartment 66 as indicated by the arrow identified by numeral 68, but cannot change any configuration settings within the core operating system. Moreover, the core operating system in the fourteenth compartment 66 allows the eleventh compartment 62, which is the proxy server labeled "low" that has the binaries and configuration files for the proxy server read and execute source programs from this fourteenth compartment 66 as indicated by the arrow identified by numeral 70, but cannot change any configuration settings within the core operating system. In addition, the core operating system in the fourteenth compartment 66 allows the thirteenth compartment 64, which is the inside server labeled "low" that has the binaries and configuration files for the inside server, read and execute source programs from this fourteenth compartment 66 as indicated by the arrow identified by numeral 72, but cannot change any configuration settings within the core operating system.

Events generated from external devices such as networking compartments can forward the previously described syslog activities with a read/write function 38 through the eighth compartment 44, which is where the outside server executes that is labeled "high," then through the tenth compartment 46, which is where the proxy server executes and filters HTTP requests based on a configurable parameter, then through the twelfth compartment 48, which is where the inside server executes that is labeled "high" and then into the host-based intrusion detection systems indicated by numeral 40. However, it is possible to directly affect or shut down the at least one software application 42.

Therefore, this secure network system 10 provides protection of content with an untrusted access, e.g., public site, available from the untrusted network, e.g., global computer system such as, but not limited to, the Internet, as well as provide safe passage of the data from this public site to an organization's secure computing environment. This provides a significant advantage for any organization that transmits and receives personal, confidential, proprietary and/or financial data. This secure network system 10 is applicable to virtually every industry with particular applicability to organizations that conduct financial transactions over a global computer system, e.g., the Internet, such as the financial services industry, as well as inventory control. Moreover, this secure network system 10 is particularly beneficial for credit card transactions. Other industries that could benefit from the secure network system include the government, e.g., military organizations, healthcare and the airline industry. Moreover, a particular benefit to the secure network system 10 is the prevention of hacking and associated defacing of websites that are accessible to the public. By using logical compartments or sensitivity labels or a combination of both, this entire secure network system 10 can be reduced or collapsed to a single processor for a significant reduction of cost for an enterprise that has Common Criteria Certification. Moreover, the present invention can work in systems that have compartments that use either WINDOWS® and/or UNIX® or a combination of both operating systems. An additional benefit of using logical compartments or sensitivity labels or a combination of both is that it provides for an ability to draw hackers or other unethical individuals into the secure network system 10 to obtain additional forensic information to predict trends that can be helpful in preventing attacks and providing reliable evidence to the appropriate authorities in law enforcement.

The number of logical compartments or sensitivity labels can vary tremendously and should not necessarily be limited to one of each type. This is especially true for the number of outside servers 44 and 60, proxy servers 46 and 62, and inside servers 48 and 64 wherein there are situations where it may be particularly advantageous to have more than one of each type of server or other type of logical compartment and/or sensitivity label.

Although the preferred embodiment of the present invention and the method of using the same has been described in the foregoing specification with considerable details, it is to be understood that modifications may be made to the invention which do not exceed the scope of the appended claims and modified forms of the present invention incorporated by others skilled in the art to which the invention pertains will be considered infringements of this invention when those modified forms fall within the claimed scope of this invention.

The invention claimed is:

1. A network computer system for providing security, wherein the network computer system comprises:
    at least one processor, at least one storage device, and at least one network interface device that are configured to implement:
    a monitoring function for the network computer system;
    at least one outside server for an untrusted computer network, wherein the monitoring function can read and execute data from, but cannot write data to, the at least one outside server for the untrusted computer network;
    at least one proxy server, wherein the at least one outside server for the untrusted computer network is able to read and write data to the at least one proxy server, wherein the monitoring function can read and execute data from, but cannot write data to, the at least one proxy server;
    at least one inside server, wherein the at least one proxy server is able to read and write data to the at least one inside server, wherein the monitoring function can read and execute data from, but cannot write data to, the at least one inside server; and
    a core operating system that is a portion of an operating system, wherein the at least one outside server, the at least one proxy server and the at least one inside server can read and execute data from, but cannot write data to, the core operating system.

2. The network computer system as set forth in claim 1, wherein the monitoring function includes at least one system level auditing function.

3. The network computer system as set forth in claim 1, wherein the at least one system level auditing function resides within a first compartment and the at least one system level auditing function transports system log protocol events, generated by the operating system, through the network computer system without providing access to the system log protocol events from the at least one outside server, the at least one proxy server and the at least one inside server.

4. The network computer system as set forth in claim 1, wherein the monitoring function includes at least one intrusion detection system.

5. The network computer system as set forth in claim 4, wherein the at least one intrusion detection system resides within a second compartment and a third compartment, wherein the second compartment monitors activity and makes comparisons to known patterns that may indicate an attack on the network computer system and the third compartment includes source code for the intrusion detection system, wherein the second compartment can read and execute data from, but cannot write data to, the third compartment.

6. The network computer system as set forth in claim 1, wherein the monitoring function includes at least one system health monitoring tool.

7. The network computer system as set forth in claim 6, wherein the at least one system health monitoring tool resides within a fourth compartment and a fifth compartment, wherein the fourth compartment monitors health and response time for the network computer system, and the fifth compartment includes source code for the system health monitoring tool, wherein the fourth compartment can read and execute data from, but cannot write data to, the fifth compartment.

8. The network computer system as set forth in claim 1, wherein the monitoring function includes at least one integrity check system.

9. The network computer system as set forth in claim 8, wherein the at least one integrity check system resides within a sixth compartment and a seventh compartment, where in the sixth compartment will provide an integrity check function to monitor changes to a baseline configuration of the network computer system and the seventh compartment includes source code for the integrity detection system, wherein the sixth compartment can read and execute the source code from, but cannot write data to, the seventh compartment.

10. The network computer system as set forth in claim 1, wherein the monitoring function includes the at least one system level auditing function, wherein the at least one system level auditing function resides within a first compartment and the system level auditing function transports system log protocol events, generated by the operating system, through the network computer system without providing access to the system log protocol events from the at least one outside server, the at least one proxy server and the at least one inside server and the monitoring function includes at least one intrusion detection system, wherein the at least one intrusion detection system resides within a second compartment and a third compartment, wherein the second compartment monitors activity and makes comparisons to known patterns that may indicate an attack on the network computer system and the third compartment includes source code for the at least one intrusion detection system, wherein the second compartment can read and execute data from, but cannot write data to, the third compartment and wherein at least one system health monitoring tool resides within a fourth compartment and a fifth compartment, wherein the fourth compartment monitors health and response time for the at least one outside server, the at least one proxy server and the at least one inside server and the fifth compartment includes source code for the at least one system health monitoring tool, wherein the fourth compartment can read and execute data from, but cannot write data to, the fifth compartment and wherein at least one integrity check system resides within a sixth compartment and a seventh compartment, wherein the sixth compartment will provide an integrity check function to monitor changes to a baseline configuration of the network computer system and the seventh compartment includes the source code for the integrity detection system, wherein the sixth compartment can read and execute data from, but cannot write data to, the seventh compartment.

11. The network computer system as set forth in claim 1, wherein the at least one outside server includes at least one eighth compartment where outside requests are received, processed, and then passed to the at least one proxy server for further processing and at least one ninth compartment where source code for the at least one outside server resides, wherein the at least one eighth compartment can read and execute data from, but cannot write data to, the at least one ninth compartment and the at least one ninth compartment can read and execute data from, but cannot write data to, the core operating system.

12. The network computer system as set forth in claim 11, wherein the source code includes encryption binaries and configuration files.

13. The network computer system as set forth in claim 10, wherein the outside server includes at least one eighth compartment where outside requests are received, processed, and then passed to the at least one proxy server for further processing and at least one ninth compartment where source code for the at least one outside server resides, wherein the at least one eighth compartment can read and execute data from, but cannot write data to, the at least one ninth compartment and the at least one ninth compartment can read and execute data from, but cannot write data to, the at least one core operating system that resides in a fourteenth compartment and the third compartment of the intrusion detection function, the fifth compartment of the at least one system health monitoring tool and the seventh compartment of the at least one integrity check function can read and execute data from, but cannot write data to, the at least one eighth compartment for the at least one outside server.

14. The network computer system as set forth in claim 1, wherein the at least one proxy server includes at least one tenth compartment where the at least one proxy server executes and filters requests from the at least one outside server, which are then passed to the at least one inside server for further processing and at least one eleventh compartment wherein source code for the at least one proxy server resides, where the at least one tenth compartment can read and execute data from, but cannot write data to, the at least one eleventh compartment and the at least one eleventh compartment can read and execute data from, but cannot write data to, the core operating system.

15. The network computer system as set forth in claim 14, wherein the source code includes binaries and configuration files.

16. The network computer system as set forth in claim 14, wherein the at least one proxy server makes buffer checks and file extension requests to ascertain whether a security threat is present.

17. The network computer system as set forth in claim 10, wherein the at least one proxy server includes at least one tenth compartment where the at least one proxy server executes and filters requests from the at least one outside server which are then passed to the at least one inside server for further processing and at least one eleventh compartment where source code for the at least one proxy server resides, wherein the at least one tenth compartment can read and execute data from, but cannot write data to, the at least one eleventh compartment and the at least one eleventh compartment can read and execute data from, but cannot write data to, the core operating system, residing in a fourteenth compartment, and the third compartment of the at least one intrusion detection function, the fifth compartment of the at least one system health monitoring tool and the seventh compartment of the at least one integrity check function can read and execute data from, but cannot write data to, the at least one tenth compartment for the at least one proxy server.

18. The network computer system as set forth in claim 17, wherein the source code includes binaries and configuration files.

19. The network computer system as set forth in claim 1, wherein the at least one inside server includes at least one twelfth compartment where the at least one inside server executes all requests received from the untrusted computer network that have been screened and deemed valid for further processing and at least one thirteenth compartment where source code for the at leas one inside server resides, wherein the at least one twelfth compartment can read and execute data from, but cannot write data to, the at least one thirteenth compartment and the at least one thirteenth compartment can read and execute data from, but cannot write data to, the core operating system.

20. The network computer system as set forth in claim 10, wherein the at least one inside server includes at least one twelfth compartment where the at least one inside server executes all requests received from the untrusted computer network have been screened and deemed valid for further processing and at least one thirteenth compartment where binaries and configuration files for the at least one inside server reside, wherein the at least one thirteenth compartment can read and execute data from, but cannot write data to, the core operating system, residing in a fourteenth compartment, and the third compartment of the at least one intrusion detection function, the fifth compartment of the at least one system health monitoring tool and the seventh compartment of the at least one integrity check function can read and execute data from, but cannot write data to, the at least one twelfth compartment for the at least one inside server.

21. The network computer system as set forth in claim 1, wherein system log protocol events produced by external devices can be forwarded through the at least one outside server, the at least one proxy server, and the at least one inside server to at least one other software application that monitors security intrusions.

22. The network computer system as set forth in claim 1, wherein external data received from the outside through an untrusted computer network can pass from the at least one outside server wherein data from the at least one outside server can be read and written to the at least one proxy server, wherein data from the at least one proxy server can be read and written to the at least one inside server, wherein data from can at least one inside server can be read and written to at least one software application for further processing.

23. A network computer system for providing security, wherein the network computer system comprises:
at least one processor, at least one storage device, and at least one network interface device that are configured to implement:
  at least one system level auditing function, wherein the at least one system level auditing function resides within a first compartment and the at least one system level auditing function transports system log protocol events produced by an operating system through the network computer system;
  at least one intrusion detection system, wherein the at least one intrusion detection system resides within a second compartment and a third compartment, wherein the second compartment monitors activity and makes comparisons to known patterns that may indicate an attack on the network computer system and the third compartment is where source code for the intrusion detection system resides, wherein the second compartment can read and execute data from, but cannot write data to, the third compartment;
  at least one system health monitoring tool, wherein the at least one system health monitoring tool resides within a fourth compartment and a fifth compartment, wherein the fourth compartment monitors health and response time for the at least one outside server, the at least one proxy server and the at least one inside server and the fifth compartment is where source code for the system health monitoring tool resides, wherein the fourth compartment can read and execute data from, but cannot write data to, the fifth compartment;
  at least one integrity check system, wherein the at least one integrity check system resides within a sixth compartment and a seventh compartment, wherein the sixth compartment will provide an integrity check function to monitor changes to a baseline configuration of the network computer system and the seventh compartment is where source code for the integrity check system resides, wherein the sixth compartment can read and execute the source code from, but cannot write data to, the seventh compartment;
  at least one core operating system, residing within a fourteenth compartment;
  at least one outside server for an untrusted computer system, wherein the outside server includes at least one eighth compartment where outside requests are received and processed and at least one ninth compartment where source code for the at least one outside server resides, wherein the at least one eighth compartment can read and execute data from, but cannot write data to, the at least one ninth compartment and the at least one ninth compartment can read and execute data from, but cannot write data to, the at least one core operating system that resides in the fourteenth compartment and the third compartment of the at least one intrusion detection function, the fifth compartment of the at least one system health monitoring tool and the seventh compartment of the at least one integrity check function can read and execute data from, but cannot write data to, the at least one outside server;
  at least one proxy server, wherein the at least one proxy server includes at least one tenth compartment where the at least one proxy server executes and filters requests from the at least one outside server and at least one eleventh compartment where source code for the at least one proxy server resides, wherein the at least one tenth compartment can read and execute data from, but cannot write data to, the at least one eleventh compartment and the at least one eleventh compartment can read and execute data from, but cannot write data to, the at least one core operating system, residing in the fourteenth compartment, and the third compartment of the at least one intrusion detection function, the fifth compartment of the at least one system health monitoring tool and the seventh compartment of the at least one integrity check function can read and execute data from, but cannot write data to, the at least one proxy server; and wherein the at least one inside server includes at least one twelfth compartment where the at least one inside server executes all and requests received from the file unsecured computer network have been screened and deemed valid for further processing by the at least one proxy server and at least one thirteenth compartment where source code for the at least one inside server resides, wherein the at least one twelfth compartment can read and execute data from, but cannot write data to, the at least one thirteenth compartment and the at least one thirteenth compartment can read and execute data from, but cannot write data to, the at least one core operating system, residing in the fourteenth compartment, and the third compartment of the at least one intrusion detection function, the fifth compartment of the at least one system health monitoring tool and the seventh compartment of the at least one integrity check function can read and execute data from, but cannot write data to, the at least one inside server.

24. The network computer system as set forth in claim 23, wherein system log protocol events produced by external devices can be forwarded through the at least one outside server, the at least one proxy server, and the at least one inside server to at least one other software application that monitors security intrusions.

25. The network computer system as set forth in claim 23, wherein data from the untrusted computer network can pass from the at least one outside server wherein data from at least one outside server can be read and written to the at least one proxy server, where data from at least one proxy server can be read and written to the at least one inside server, wherein data from can at least one inside server can be read and written to at least one software application for further processing.

26. A computer-implemented process for providing security to a network computer system comprising:
 reading and executing data from at least one outside server for an untrusted computer network with a monitoring function while forbidding the monitoring function from writing data to the at least one outside server;
 reading and executing data from at least one proxy server for an untrusted computer network with the monitoring function while forbidding the monitoring function from writing data to the at least one proxy server;
 reading and executing data from at least one inside server for an untrusted computer network with the monitoring function while forbidding the monitoring function from writing data to the at least one inside server;
 reading and writing data from the at least one outside server to the at least one proxy server;
 reading and writing data from the at least one proxy server to the at least one inside server; and
 reading and executing data from a core operating system, which is at least a portion of an operating system, with the at least one outside server, the at least one proxy server and the at least one inside server while forbidding the at least one outside server, the at least one proxy server and the at least one inside server from writing data to the core operating system.

27. The process for providing security to a network computer system as set forth in claim 26, wherein the monitoring function includes auditing of the network computer system.

28. The process for providing security to a network computer system as set forth in claim 27, wherein the auditing of the network computer system, within a first compartment, includes transporting system log protocol events, generated by the operating system, through the network computer system without providing access to the system log protocol events from the at least one outside server, the at least one proxy server and the at least one inside server.

29. The process for providing security to a network computer system as set forth in claim 26, where in the monitoring function includes detecting of intrusions in the network computer system.

30. The process for providing security to a network computer system as set forth in claim 29, wherein the detecting of intrusions includes monitoring activity and making comparisons to known patterns that may indicate an attack on the network computer system within at least one second compartment and providing source code for the monitoring activity and making comparisons to known patterns that may indicate an attack on the network computer system within at least one third compartment and reading and executing data located in the at least one third compartment from the at least one second compartment while forbidding the at least one second compartment from writing data to the at least one third compartment.

31. The process for providing security to a network computer system as set forth in claim 26, wherein the monitoring function includes monitoring health of the network computer system.

32. The process for providing security to a network computer system as set forth in claim 31, wherein the monitoring health of the network computer system includes monitoring health and response time for the network computer system, within at least one fourth compartment, and providing source code for monitoring health and response time for the network computer system, within at least one fifth compartment, wherein the at least one fourth compartment can read and execute data from, but cannot write data to, the at least one fifth compartment.

33. The process for providing security to a network computer system as set forth in claim 26, wherein the monitoring function includes checking of integrity of the network computer system.

34. The process for providing security to a network computer system as set forth in claim 33, wherein the checking of integrity of the network computer system includes monitoring changes to a baseline configuration of the network computer system, within the at least one sixth compartment, and providing source code for monitoring changes to a baseline configuration of the network computer system, within the at least one seventh compartment, where in the at least one sixth compartment can read and execute data from, but cannot write data to, the at least one seventh compartment.

35. The process for providing security to a network computer system as set forth in claim 26, wherein the receiving of outside requests from the at least one outside server for an untrusted computer network is with the at least one eighth compartment and providing source code for receiving of outside requests from the at least one outside server for the untrusted computer network is with the at least one ninth compartment, wherein the at least one eighth compartment can read and execute data from, but cannot write data to, the at least one ninth compartment.

36. The process for providing security to a network computer system as set forth in claim 26, wherein the at least one proxy server executes and filters requests from the at least one outside server with at least one tenth compartment and source code for executing and filtering requests from the at least one outside server is provided within at least one eleventh compartment, wherein the at least one tenth compartment can read and execute data from, but cannot write data to, the at least one eleventh compartment.

37. The process for providing security to a network computer system as set forth in claim 26, wherein the reading and writing of data to the at least one inside server from the at least one proxy server is with at least one twelfth compartment where the at least one inside server executes all requests received from the untrusted computer network that have been screened and deemed valid for further processing and source code for the at least one inside server resides within at least one thirteenth compartment, wherein the at least one twelfth compartment can read and execute data from, but cannot write data to, the at least one thirteenth compartment.

38. The process for providing security to a network computer system as set forth in claim 26, further comprising forwarding system log protocol events produced by external devices through the at least one outside server, the at least one proxy server, and the at least one inside server to the at least one other software application that monitors security intrusions.

39. The process for providing security to a network computer system as set forth in claim 26, further comprising:
  passing data from the outside through an untrusted computer network to the at least one outside server;
  reading and writing data from the at least one outside server to the at least one proxy server;
  reading and writing data from the at least one proxy server to the at least one inside server; and
  reading and writing data from the at least one inside server to at least one software application for further processing.

40. A computer-implemented process for providing security for a network computer system comprising:
  utilizing a system level auditing function, wherein the system level auditing function resides within a first compartment;
  transporting system log protocol events produced by an operating system through the network computer system with the system level auditing function;
  utilizing an intrusion detection system, wherein the intrusion detection system resides within a second compartment and a third compartment, wherein the third compartment includes source code for the intrusion detection system;
  inspecting network activity and making comparisons to known patterns that may indicate an attack on the network computer system with the second compartment of the intrusion detection system;
  reading and executing data located in the third compartment with the second compartment of the intrusion detection system while forbidding the second compartment from writing data to the third compartment;
  utilizing a system health monitoring tool, wherein the system health monitoring tool resides within a fourth compartment and a fifth compartment, wherein the fifth compartment includes source code for the system health monitoring tool;
  monitoring health and response time for the network computer system with the fourth compartment of the system health monitoring tool;
  reading and executing data located in the fifth compartment with the fourth compartment of the system health monitoring tool while forbidding the fourth compartment from writing data to the fifth compartment;
  utilizing an integrity check system, wherein the integrity check system resides within a sixth compartment and a seventh compartment;
  monitoring changes to a baseline configuration of the network computer system with the sixth compartment;
  reading and executing source code located in the seventh compartment with the sixth compartment while forbidding the sixth compartment from writing data to the seventh compartment;
  providing a core operating system residing within a fourteenth compartment;
  receiving a processing outside requests with at least one outside server for an untrusted computer network, wherein the at least one outside server includes at least one eighth compartment where outside requests are received and processed and at least one ninth compartment includes source code for the at least one outside server;
  reading and executing data from the at least one ninth compartment with at least one eighth compartment while forbidding the at least one eighth compartment from writing data to the at least one ninth compartment;
  reading and executing data from the fourteenth compartment with at least one ninth compartment while forbidding the at least one ninth compartment from writing data to the fourteenth compartment;
  reading and executing data from the at least one eighth compartment for the at least one outside server with the third compartment of the intrusion detection system, the fifth compartment of the system health monitoring tool and the seventh compartment of the check system while forbidding the third compartment, the fifth compartment, and the seventh compartment from writing data to the at least one eighth compartment;
  executing and filtering requests from the at least one outside server to the at least one proxy server, wherein the at least one proxy server includes at least one tenth compartment where the at least one proxy server executes and filters requests from the at least one outside server and at least one eleventh compartment includes source code for the at least one proxy server;
  reading and executing data from the fourteenth compartment with at least one eleventh compartment while forbidding the at least one eleventh compartment from writing data to the fourteenth compartment;
  reading and executing data from the at least one tenth compartment for the at least one proxy server with the third compartment of the intrusion detection system, the fifth compartment of the system health monitoring tool and the seventh compartment of the check system while forbidding the third compartment, the fifth compartment, and the seventh compartment from writing data to the at least one tenth compartment;
  executing requests received from the untrusted computer network have been screened and deemed valid for further processing by the at least one proxy server with at least one twelfth compartment for the at least one inside server and at least one thirteenth compartment includes source code for the at least one inside server;
  reading and executing data from the fourteenth compartment with the at least one thirteenth compartment while forbidding the at least one thirteenth compartment from writing data to the fourteenth compartment; and
  reading and executing data from the at least one twelfth compartment for the at least one inside server with the third compartment of the intrusion detection system, fifth compartment of the system health monitoring tool and the seventh compartment of the check system while forbidding the third compartment, the fifth compartment, and the seventh compartment from writing data to the at least one twelfth compartment.

41. The computer-implemented process as set forth in claim 40, further comprising forwarding system log protocol events produced by external devices through the at least one outside server, the at least one proxy server, and the at least one inside server to the at least one other software application that monitors security intrusions.

42. The computer-implemented process as set forth in claim 40, further comprising reading and writing data from the at least one inside server to at least one software application for further processing.

* * * * *

UNITED STATES PATENT AND TRADEMARK OFFICE
CERTIFICATE OF CORRECTION

PATENT NO. : 7,669,239 B2
APPLICATION NO. : 10/708004
DATED : February 23, 2010
INVENTOR(S) : Dickelman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1788 days.

Signed and Sealed this

Twenty-eighth Day of December, 2010

David J. Kappos
*Director of the United States Patent and Trademark Office*